United States Patent [19]

Laughner et al.

[11] Patent Number: 5,552,224

[45] Date of Patent: *Sep. 3, 1996

[54] CARBONATE BLEND POLYMER COMPOSITIONS COMPRISING A HIGH MOLECULAR WEIGHT BRANCHED CARBONATE POLYMER COMPONENT AND METHODS FOR THEIR PREPARATION

[75] Inventors: Michael K. Laughner; Maurice J. Marks, both of Lake Jackson, Tex.

[73] Assignee: The Dow Chemical Company, Midland, Mich.

[*] Notice: The term of this patent shall not extend beyond the expiration date of Pat. No. 5,508,359.

[21] Appl. No.: 156,174

[22] Filed: Nov. 22, 1993

[51] Int. Cl.$^6$ .................................................. C08L 69/00
[52] U.S. Cl. ........................... 428/401; 525/462; 525/467; 525/468; 525/469
[58] Field of Search .............................. 525/462, 468, 525/469, 467; 428/401

[56] References Cited

U.S. PATENT DOCUMENTS

| | | | |
|---|---|---|---|
| 3,166,606 | 1/1965 | Reinking et al. . | |
| 3,652,715 | 3/1972 | Holub | 525/468 |
| 3,770,697 | 11/1973 | Holub et al. . | |
| 3,931,108 | 1/1976 | Binsack et al. . | |
| 4,230,548 | 10/1980 | Adelmann et al. | 528/196 |
| 4,415,724 | 11/1983 | Mark et al. | 528/204 |
| 4,415,725 | 11/1983 | Hedges et al. | 528/204 |
| 4,436,879 | 3/1984 | Miller et al. | 525/439 |
| 4,562,242 | 12/1985 | Mark et al. | 528/193 |
| 4,652,602 | 3/1987 | Liu | 524/449 |
| 4,912,194 | 3/1990 | Rosenquist | 528/196 |
| 4,999,408 | 3/1991 | Rosenquist | 525/462 |
| 5,141,824 | 12/1992 | Marks et al. | 528/198 |
| 5,198,527 | 3/1993 | Marks | 525/462 |
| 5,286,813 | 2/1994 | Morioka | 525/468 |

FOREIGN PATENT DOCUMENTS

| | | |
|---|---|---|
| 0390064 | 3/1990 | European Pat. Off. . |
| 0498406 | 2/1995 | European Pat. Off. . |
| 138754 | 8/1983 | Japan ....................... 525/462 |
| 215051 | 10/1985 | Japan . |
| 016962 | 1/1986 | Japan ....................... 525/462 |
| 63-015821 | 1/1988 | Japan . |
| 63-003023 | 1/1988 | Japan . |
| 03243655 | 10/1991 | Japan . |
| 03281567 | 12/1991 | Japan . |

OTHER PUBLICATIONS

A Rheological Study of Branching in Polycarbonate by Blending, Hansen, M. G. and Jansma, J. B., ACS, vol. 20, 2, 1979, pp. 157–159.

Copending Application Serial No. 08/019,950 filed Feb. 19, 1993.

Copending Application Serial No. 08/156,154 filed Feb. 22, 1993.

*Primary Examiner*—David Buttner

[57] ABSTRACT

Novel carbonate polymer blend compositions and processes for their preparation are disclosed where an amount of a high molecular weight branched carbonate polymer component (HMWB PC) is combined with a second, lower molecular weight polycarbonate. A HMWB PC component is selected which is homogeneously dispersible in a blend with the second component. A preferred aspect of the invention is directed to intermediate compositions and processes for their use where the second PC is combined with a HMWB PC precursor having latent thermally reactive moieties which can be activated to produce a desired and controlled level of high molecular weight, branched carbonate polymer component. Arylcyclobutene moieties are found to be preferred latent thermally reactive moieties. The carbonate polymer blends according to the present invention have surprisingly improved combinations of physical properties, thermal stability, color, melt strength, transparency and processability. When shaped or molded into various types of articles, the articles posses these very desirable properties and are additionally able to be provided with a low gloss or matte surface. These polymeric compositions are well suited for use in preparing molded articles, such as injection molded articles; composite or blend materials with further filler or blend components; extruded articles such as sheet, fiber or film; and blow molded or thermoformed articles.

33 Claims, No Drawings

CARBONATE BLEND POLYMER COMPOSITIONS COMPRISING A HIGH MOLECULAR WEIGHT BRANCHED CARBONATE POLYMER COMPONENT AND METHODS FOR THEIR PREPARATION

FIELD OF THE INVENTION

This invention relates to novel carbonate polymer blend compositions comprising two carbonate polymer components. As first component, the blend comprises an amount of a high molecular weight, branched carbonate polymer component ("HMWB PC"). As second component the blend comprises an amount of a lower molecular weight carbonate polymer. According to a preferred aspect of the invention, the high molecular weight component is homogeneously dispersible, preferably soluble or miscible therein. The invention also involves an improved intermediate blend composition for preparing such compositions which intermediate composition comprises a precursor for the first component. This precursor is a carbonate polymer having latent thermally reactive moieties which can be thermally activated to produce a desired and controlled level of high molecular weight, branched carbonate polymer component.

Improved carbonate polymer blend compositions are very easily prepared when the precursor for the first carbonate polymer component is combined with an amount of a second carbonate polymer and the latently reactive moieties are thermally activated to produce a high molecular weight, branched carbonate polymer component. These polymeric compositions are well suited for use in preparing molded articles, such as injection molded articles; composite or blend materials with further filler or blend components; extruded articles such as sheet, fiber or film; and blow molded or thermoformed articles.

BACKGROUND OF THE INVENTION

It is known that articles prepared from a carbonate polymer ("PC") having a higher molecular weight (Mw) possess generally better physical properties than if molded from a lower molecular weight carbonate polymer. Unless otherwise indicated, the references to "molecular weight" herein refer to weight average molecular weights ("Mw") determined on the carbonate polymers using gel permeation chromatography with a bisphenol A polycarbonate standard. Otherwise, viscometry or light scattering can also be used to determine weight average molecular weight. It should be noted that various references, including several that are discussed below, refer to "viscosity average" molecular weight, which is not the same as weight average molecular weight but can be correlated or converted to Mw values.

It is also known that the higher the molecular weight of the carbonate polymers, the more difficult they are to process due to their higher viscosity and corresponding lower melt flow rate. See for example Japanese Patent Publication 03-243,655 (1992) where amounts of a lower molecular weight carbonate polymer are incorporated into a high molecular carbonate polymer composition in attempting to improve the flow and processability properties of such carbonate polymers. However, it is known that the separately prepared higher and lower molecular weight components are difficult to homogeneously blend due to their difference in melt viscosities and do not produce the best possible combinations of polymer processability and molded part physical properties.

It is well known that branched carbonate polymers are commercially available and are known to have greater melt strength and be more shear sensitive in the melt phase than linear polycarbonates. Therefore, the branched polycarbonates are known to be better suited for some uses such as blow molding or thermoforming. In Japanese Patent Publication 60- 215,051 (1985), it is shown that branched resins can be incorporated in varying amounts into blends with a high melt flow rate (low molecular weight) linear carbonate polymer to improve the melt strength of the low molecular weight resin. It is also known that additives, such as Teflon polytetrafluoroethylenes, can be added to polycarbonates to provide an increase in melt strength but have drawbacks such as loss in transparency and toughness.

In U.S. Pat. No. 4,912,914 it is proposed that crosslinked or branched polycarbonates can be prepared by incorporating a diester diphenolic monomer into the carbonate polymer backbone, then heat activating the crosslinking reaction. However, since the crosslinking reaction causes the polymer backbone to be cut at the point of crosslinking, the polymers that are taught would be expected to have undesirable levels of low molecular weight polymer byproducts and high molecular weight or crosslinked gel byproducts due to the random and uncontrollable crosslinking. These polymers would also be expected to have higher color levels and reduced hydrolytic stability.

In U.S. Pat. No. 3,770,697 and U.S. Pat. No. 3,652,715 carbonate polymers are provided with thermally activated, terminal or pendant unsaturated imido groups. These functionalized, curable polymers are then taught to be employed independently or in mixtures with other monomers or polymers, as molding compounds, films, laminates, and the like. A cast film that was prepared from a blend of an imido-sunctionalized carbonate polymer composition and an amount of standard, non-functionalized polycarbonate and reacted using an additional chemical initiator compound showed an increase in heat resistance. It has been found, however, that the molecular weight of these products is unstable and that the products have an undesirable discoloration. It has also been found, unfortunately, that such unsaturated imido-functionalized carbonate polymers are not readily produced in interfacial carbonate polymer production processes due to the nitrogen-containing imido groups that must be incorporated. In addition, the initiation and reaction process requires relatively long reaction times.

It is therefore a goal of the present invention to provide improved carbonate polymer compositions which are easily prepared and possess good combinations of processability, stability and physical properties. Preferably such compositions are easily prepared from one or more components produced in an interfacial carbonate polymer process. It is also desired to prepare such compositions without having to incorporate an additional free radical initiating compound such as an organic peroxide or employ radiation techniques which can also lead to polymer decomposition. It is also desired to prepare such improved carbonate polymer blend compositions using a high molecular weight branched carbonate polymer component that can be readily mixed homogeneously into the second component while avoiding unacceptable levels of gel that detract from the balance of the desirable physical, theological and optical properties.

SUMMARY OF THE INVENTION

Therefore, in one aspect the invention is a carbonate polymer blend composition comprising a first high molecular weight branched carbonate polymer component and a second, different carbonate polymer component having a lower molecular weight than the first component, characterized in that the first high molecular weight branched carbonate polymer component is themally stable at a temperature at least 100° C. above the Tg of the carbonate polymer blend composition. Preferably the first carbonate polymer component is prepared from a precursor component comprising a carbonate polymer having one or more latently reactive moieties capable of forming a high molecular weight branched carbonate polymer upon heat activation.

In another aspect, the present invention is an intermediate carbonate polymer blend composition suitable for preparing a carbonate polymer blend composition as described above comprising a precursor component having one or more latently reactive moleties capable of forming a high molecular weight branched carbonate polymer upon heat activation and a second, different carbonate polymer component having a lower molecular weight than the high molecular weight branched component. In a preferred aspect, the precursor component comprises terminally located, latently reactive arylcyclobutene moieties.

A particularly advantageous aspect of the present invention is the obtainment of the desirable physical property combinations in an easier fashion than those described in the art. A preferred aspect of the present invention is an improved process for preparing a blend of a first, high molecular weight branched carbonate polymer component and a second, lower molecular weight carbonate polymer component different from the first carbonate polymer component comprising the steps of (a) preparing a precursor component capable of forming the first high molecular weight branched carbonate polymer component, said precursor component comprising a carbonate polymer containing latent themally activated reactive moieties; (b) combining the precursor component with the second carbonate polymer; and (c) themally activating the latently reactive moleties of the precursor component to provide a generally homogeneous carbonate polymer blend composition.

In a preferred process aspect, in step (b), the precursor component is combined with the second carbonate polymer component by (1) dry blending or dual feeding the precursor component with the second, lower molecular weight carbonate polymer component and then (2) melt blending the precursor and second components at a temperature and for a time less than sufficient to significantly thermally activate the latently thermally reactive moleties and (3) recovering an intermediate carbonate polymer blend composition comprising a precursor component having one or more latently reactive moleties. According to these processes, the precursor component comprising latent, thermally activated reactive moleties is intimately dispersed throughout the second carbonate polymer prior to or in conjunction with thermal activation of the latently reactive moiety and creates a high molecular weight branched carbonate polymer component in situ. In this way, carbonate polymer components of similar initial molecular weights can be more readily blended prior to the creation of the high molecular weight branched component. This will result in a better, more homogeneous mixture of the high molecular weight branched carbonate polymer component with the other carbonate polymer component.

It has been surprisingly found that although the precursor carbonate polymer component with latent, thermally reactive moieties would have a tendency to form a highly crosslinked polycarbonate gel when reacted separately, when dispersed in a carbonate polymer composition prior to the activation of such moieties, undesirably large domains of highly crosslinked polymer gels are substantially reduced and preferably eliminated insofar as they produce undesirable effects in the physical, rheological, optical or surface aesthetic properties in molded articles.

In other embodiments, the invention involves ignition resistant compositions which are optionally transparent and comprise: as a first component, a carbonate polymer drip reducing additive; as a second component, a second different carbonate polymer component; and, as a third component, other optional ignition resistance additives, wherein the ignition resistance of the blend composition, when tested according to UL 94 attains at least a V-O rating at ⅛ inch or is more ignition resistant. Preferably, the carbonate polymer drip reducing additive is a high molecular weight branched carbonate polymer drip reducing additive which may be formed prior to or during ignition conditions. In other aspects, the invention involves improved processes for preparing fibers, blow molded or thermoformed parts, opaque parts having controlled gloss levels and transparent to translucent parts having controlled light diffusing properties. The parts and shaped articles that result are also aspects of this invention.

As will be described in more detail below, the carbonate polymers according to the present invention have surprisingly improved combinations of physical properties, thermal stability, color, melt strength, transparency and processability. When shaped or molded into various types of articles the very desirable properties mentioned above are obtained. In addition, depending upon the molding or shaping method, light diffusing and/or surface altering effects may also be observed. In particular, the articles can be provided with a range of surface and light diffusing effects including transparency, translucence, high gloss, non-glare, low gloss, mottling, frosting or matte surface.

DETAILED DESCRIPTION

A key feature in preparing the compositions according to this invention is obtaining a suitable high molecular weight, branched carbonate polymer component ("HMWB PC") which is sufficiently stable and dispersible in the balance of the carbonate polymer composition. Preferably the HMWB PC is capable of providing a homogeneous mixture with the other carbonate polymer component in the claimed compositions without obtaining undesirable byproducts such as phase-separated very high molecular weight polymer, highly crosslinked gels or a very low molecular weight component and without the use of additional reactive additives such as free radical initiating compounds which can cause undesired degradation, color formation and/or uncontrolled crosslinking in the polymer composition or additives. Moreover, the use of free radical generating initiators is incompatible with the use of many of the known polymer stabilizing additives which are radical scavengers and are needed in carbonate polymers.

As compared to similar types of materials that have been previously prepared or obtainable, it has been found to be important that the final high molecular weight branched component for use according to the present invention be themally stable at a temperature at least 100° C., preferably at least 125° C., more preferably at least 150° C., above the Tg of the carbonate polymer blend composition. For the types of carbonate polymers that are most likely to be used as the lower molecular weight second component, such as the commercially available polycarbonate resins based on bisphenol A, the Tg is about 150° C. Likewise, where the HMWB PC is based on bisphenol A, the Tg will be in the same range and the claimed blends based on such polymers will have a Tg in this range. Otherwise, where there is a difference between the Tg's of the two components that are combined and provided that the two components are sufficiently miscible to provide the homogeneous blends according to this invention, the resulting blend will have a single intermediate Tg. As used herein and well known to those skilled in the art, the term Tg refers to the glass transition temperature of the polymer or blend and is defined as the inflection point on the heat flow curve as determined by differential scanning calorimetry.

It is therefore one of the novel and advantageous features of this invention to provide carbonate polymer blends of this type with a HMWB PC component that is thermally stable during extended exposure to higher temperatures. This level of thermal stability can be determined by various known techniques such as by thermogravimetric analysis or by the measurement of color development or molecular weight change with increasing heat. Obviously, where the lower molecular weight second component (e.g., a commercially available polycarbonate resins based on bisphenol A) is determined or known to be sufficiently thermally stable, thermal instability or stability of the HMWB PC can be determined based on thermal instability or stability of the blend.

In particular, with regard to thermal stability, it is preferred that the compositions according to the present invention employ a high molecular weight branched component that maintains its molecular weight (after completion of any in situ forming reaction) upon heating in nitrogen to a temperature at least 100° C., preferably at least 125° C., more preferably at least 150° C. above the Tg of the carbonate polymer blend composition. By the term maintains its molecular weight, it is meant that the HMWB PC does not contribute further significant molecular weight increases or decreases to the blend, preferably none of more than 10%, more preferably none of more 5% from its initial value. Preferably there is minimal color developed under these conditions, it being desirable to avoid the brown coloration that is observed when a carbonate polymer that is not thermally stable is heated to temperatures 100 to 150° C. above the Tg of the carbonate polymer.

The high molecular weight branched carbonate polymers suitable for use as the first component in the compositions according to the present invention can be prepared by techniques known in the literature. In general, these carbonate polymers are prepared from one or more multihydric components by reacting the multihydric compound, such as a diphenol, with a carbonate precursor such as phosgene, a haloformate or a carbonate ester such as diphenyl- or dimethyl carbonate. Aromatic carbonate polymers are preferred and aromatic diphenols are preferred for use as at least part of the multihydric compound. Preferred diphenols include but are not limited to 2,2-bis (4-hydroxyphenyl)-propane (i.e., bisphenol A), phenol, 4,4'-(9-H-fluorene-9-ylidene)bis (i.e., bishydroxyphenylfluorene), 4,4'-thiodiphenol (TDP), 1,1-bis (4-hydroxyphenyl)-1-phenyl ethane (bisphenol AP); phenolphthalein; bis (4-hydroxyphenyl) diphenyl methane; tetrabromobisphenol A (TBBA); and tetrachlorobisphenol A (TCBA). These carbonate polymers also include aromatic carbonate polymers prepared from two or more different dihydric phenols or a combination of a dihydric phenol and a glycol or a hydroxy- or acid-terminated polyester or a dicarboxylic acid in the event a carbonate copolymer or heteropolymer is desired.

The high molecular weight branched carbonate polymers can be prepared from such materials by any of several known processes such as the known interfacial, solution or melt processes. Suitable types and amounts of chain terminators (typically monophenolic compounds) and or branching agents (typically phenols having three or more hydroxy groups) can be employed to obtain the desired molecular weight and branching degrees in the high molecular weight branched component.

In general, by whatever production technique it is prepared, the high molecular weight, branched polymer should have a weight average molecular weight of at least about 3 times that of the second carbonate polymer, preferably at least about 5 times and more preferably at least about 10 times. In order to obtain polymer blends with minimized levels of gels and other beneficial effects of the high molecular weight branched component, it has been found that the weight average molecular weight of the high molecular weight branched component should not be higher than about 200 times that of the second carbonate polymer, preferably not higher than about 150 times, more preferably not higher than about 100 times, more preferably not higher than about 50 times.

When using a linear carbonate polymer based on bisphenol A and having a weight average molecular weight in the range of 10,000 to 60,000, as the second, lower molecular weight carbonate component, it has been found that the weight average molecular weight of the high molecular weight branched component should be at least about 100,000, preferably at least about 125,000, more preferably at least about 150,000. Correspondingly, in combination with second components of these types, the weight average molecular weight of the high molecular weight, branched component is generally less than about 2,000,000, preferably less than about 1,500,000, more preferably less than about 1,000,000.

It has been found very advantageous to prepare suitable high molecular weight, branched carbonate polymer by using a precursor carbonate polymer component which has latently reactive moieties. These moieties should react with sites in the carbonate polymer or with one or more other latently reactive moieties to form the HMWB PC. These moieties can be incorporated into a carbonate polymer when that polymer is being initially polymerized or attached to the polymer in a later functionalization step. Preferably the precursor component latently reactive moieties, when they react primarily with one another, are capable of forming products having an average functionality greater than two. This means that for at least a portion of the moieties, more than two of the moieties react together and thus form branches from a polymer backbone chain. Latently reactive moieties forming products having an average functionality of two or less would produce only chain extension products without branches off the backbone. Preferably the selected latently reactive moieties can be rapidly activated, preferably thermally, without the use of additional reactive compounds at a desired point (temperature/time history) in the blend preparation process and/or in the process for preparing shaped articles. Selection of a preferred latently reactive compound and avoidance of the additional reactive compounds produces a high molecular weight, branched carbonate polymer without producing undesired, low molecular weight byproducts or highly crosslinked polymer gels. Most preferably, such moiety can be incorporated into the carbonate polymer in an interfacial carbonate polymer polymerization process.

As used herein, the term "interfacial carbonate polymer polymerization process" refers to a process where the multihydric reactants, including any multi- or mono-reactive compounds used to incorporate the latently reactive moiety, are dissolved in a water phase by forming an alkali metal adduct, then reacted with the carbonate polymer precursor forming a polymer which is dissolved in a separate organic phase. For example, dihydric phenols are dissolved as alkali metal phenates for reaction with the carbonate precursor forming an aromatic carbonate polymer which is dissolved in a separate organic phase. As those skilled in this area know, nitrogen-containing moieties, such as the unsaturated imido compounds of U.S. Pat. No. 3,652,715 and U.S. Pat. No. 3,770,697, cannot generally be present or incorporated in such a process and are therefore not suitable for use in this aspect of the present invention.

According to a preferred aspect of the present invention, an intermediate composition is formed comprising a carbonate polymer precursor component having latently reactive moieties and a second carbonate polymer component having a lower molecular weight than the final high molecular weight branched component. Then, a high molecular weight, branched carbonate polymer is prepared without the use of added radical initiating compounds, or the like, merely by activation of the latently reactive moieties, preferably thermally. As known in the art and shown in U.S. Pat. No. 3,652,715 and U.S. Pat. No. 3,770,697, it is often necessary to incorporate reactive additives such as organic peroxides in order to initiate the reaction or addition polymerizing activity of functional moieties at sufficient rates. However, it is generally undesirable to incorporate chemicals of this type in molding resins due to the increased expense, possibility of volatile byproducts and deleterious residues. Therefore, the compositions according to the present invention, without such chemical initiator additives, offer an unexpected benefit in terms of being able to provide equivalent or better results in terms of ease of preparation, stability and performance of the resultant resins.

As mentioned, in a preferred embodiment of the present invention, the latently reactive moieties are activated thermally and at temperatures and other conditions below which any of the other carbonate polymers in the blend composition are degraded. By "thermally" or "heat" activated, it is meant that the reaction of the moiety with one or more other like moieties or reactive sites will occur at a reasonable rate upon bringing the composition to an elevated temperature but will not occur at a significant rate, preferably not at any measurable or rate, at ambient temperatures (i.e., below about 60° C., preferably below about 50° C.). With regard to the temperatures which are sufficient to initiate reaction at reasonable rates, these are preferably at least about the blend Tg, more preferably at least about 100° C. above the blend Tg, most preferably at least about 150° C. above the blend Tg. By "reasonable rate" it is meant that the reaction is essentially completed and the HMWB PC is thermally stable within about 24 hours, preferably about 10 hours, more preferably about 1 hour, most preferably about 0.25 hour after bringing the composition to the elevated temperature.

It is also important to be able to thermally activate such latent reactive moieties under conditions and particularly at temperatures below which any of the other carbonate polymers in the blend composition are degraded. The degradation conditions for a particular carbonate polymer, of course, depend somewhat on the exact composition of the carbonate polymer, including the particular multihydroxy compound(s) upon which it is based. For example, in the case of polycarbonates based on phosgene and bisphenol A, it has been found that unacceptable degradation begins to occur at temperatures on the order of about 400° C. Therefore, thermally activated latently reactive moieties for use with polycarbonates based on phosgene and bisphenol A should preferably be activated at temperatures below about 400° C.

A preferred technique to provide a precursor component with a suitable latent, thermally reactive moiety is to utilize arylcyclobutene terminated carbonate polymers such as are shown in U.S. Pat. No. 5,198,527 and U.S. Pat. No. 5,171,824. It has been found that the arylcyclobutene terminated carbonate polymers are readily processable at standard carbonate polymer processing conditions and can be very readily combined with and thoroughly dispersed in a second carbonate polymer component across a range of molecular weights in the second component. As shown, the arylcyclobutene moieties can then be heat or thermally activated to combine via the arylcyclobutene moieties to produce the stable, high molecular weight, branched polymer component. These are especially preferred high molecular weight carbonate polymer components since the arylcyclobutene reaction does not require any free radical initiator or other activating compounds to initiate the addition reaction at reasonable temperatures and conditions for processing Bisphenol A-based polycarbonate.

Moreover, the arylcyclobutene reaction is exceptionally clean in that it does not simultaneously produce any low molecular weight byproduct materials as are typically resulting from many of the carbonate polymer crosslinking reactions. The arylcyclobutene combination reaction is relatively quick and sufficiently selective to produce a high molecular weight, branched carbonate polymer during an extrusion or molding process employing the precursor polymer. In addition, it should be noted that substitution of the aryl ring of the arylcyclobutene compounds can be used to increase or decrease the reactivity of the cyclobutene group.

In terms of the arylcyclobutene terminated carbonate polymers suited for use as the high molecular weight branched carbonate polymer component, it has been found desirable to incorporate the arylcyclobutene in amounts of at least about 0.01, preferably at least about 0.02, and most preferably at least about 0.03 mole arylcyclobutene moieties per mole diphenol monomer in the carbonate polymer to obtain suitable high molecular weight branched carbonate polymer components. Preferred arylcyclobutene terminated carbonate polymers suited for use as the high molecular weight branched carbonate polymer component would contain arylcyclobutene in amounts below that at which unacceptable levels of insoluble polymer gels are formed, desirably less than about 0.5, preferably less than about 0.4 and more preferably less than about 0.3, and most preferably less than about 0.2 mole arylcyclobutene moieties per mole diphenol monomer in the carbonate polymer.

Other latent, thermally reactive moieties suitable for use in preparing high molecular weight branched carbonate polymer components include, for example, cyanate, biphenylene, vinyl, propargyl, acrylic, methacrylic and allyl.

It has been found that the desired combination of properties in the final blend composition together is affected by the three way combination of the molecular weight, the level of branching, and the amount of the high molecular weight, branched component. Therefore, these individual features depend upon the others and can vary across fairly broad ranges. In particular, the level of branching and the amount of the high molecular weight branched component are closely related, with higher levels of branching reducing the amounts of the component needed to provide a desired effect.

In the case of latently reactive moieties in the precursor component, the amount of latently reactive moieties in the HMWB PC precursor can be expressed as the number of moles of reactive moiety per mole of diphenol in the precursor PC component. This is referred to as the mole per mole ratio or as "m/m". Then, the amount of latently reactive moieties in the mixture of the two PC components (prior to reaction of those moieties) can be calculated as the m/m ratio multiplied by the weight percent of the latently reactive precursor PC component in the mixture ("wt %"). In general, in the case of latently reactive moieties such as the arylcyclobutene moieties, it has been found that the latent reactive moiety concentration (which determines the amount of branching) and the amount of high molecular weight branched component should be selected such that the amount of latently reactive moieties in the mixture of the two PC components prior to their reaction (in units of m/m latent reactive moiety times wt % precursor component) should be greater than 0.05, preferably greater than 0.1, and most preferably greater than 0.15; and should be less than 2.0, preferably less than 1.75, and most preferably less than 1.50. It is otherwise difficult to directly measure the degree of branching in the branched, high molecular weight component, especially when this component has been prepared in situ by activation of a latently reactive moiety.

In general, however, it can be indirectly determined whether there is a sufficient degree of branching in the high molecular weight branched carbonate polymer by measuring the change in shear sensitivity due to the incorporation of the high molecular weight branched carbonate polymer in a carbonate polymer blend composition. It has been found that the high molecular weight branched component should have a degree of branching sufficient to provide an improvement or increase in the shear sensitivity of the resulting blend. In other words, the HMWB PC is sufficiently branched if it provides "shear thinning" in the final blend composition. This means that in the viscosities of the blend composition and the lower molecular weight carbonate polymer component alone are independently measured at increasing levels of shear, the measured viscosity of the claimed blend composition is observed to be reduced to a greater degree or at a greater rate than for the lower molecular weight carbonate polymer component without the high molecular weight branched component. It has been found that high molecular weight branched components with higher degrees of branching will provide shear sensitivity improvements at lower levels while lower degrees of branching will conversely require use of the component in larger amounts to provide shear sensitivity improvements. These measurements of shear sensitivity can be done by standard techniques with dynamic mechanical spectroscopy (DMS).

In particular, a fairly standard measurement technique for shear sensitivity of carbonate polymers involves measuring the complex viscosity of a polymer ($\eta$) under two different shear levels, 0.3 radians per second (lower shear) and 10 radians per second (higher shear) by dynamic mechanical spectroscopy at 280° C. Then, the ratio of those two numbers is determined, $\eta/\eta$ (0.3/10). The value of the $\eta/\eta$ ratio for the linear polycarbonate control sample is taken as a baseline value of 1. Values of the $\eta/\eta$ ratio greater than 1.3, preferably greater than or equal to 1.5, more preferably greater than or equal to 2, show that there is an "improvement" or "increase" in shear sensitivity as that term is used herein.

In general, the degree of branching can sometimes be directly determined in the high molecular weight branched carbonate polymer by measuring the concentration of reacted branching agent in an amount of the high molecular weight branched carbonate polymer prior to incorporation in the blend or that has been isolated from the carbonate polymer blend compositions according to the present invention. The concentration of reacted branching agent in the high molecular weight branched carbonate polymer can typically be determined by IR or NMR spectroscopy or by liquid chromatography, depending upon the nature of the branching agent. However, the lower levels of branching agent, although detectable by virtue of the shear sensitivity they impart, are very difficult to quantify by direct measurement techniques.

As mentioned above, the desired combination of properties in the final blend composition together with the level of branching in the high molecular weight, branched component determine the level of high molecular weight, branched component in the carbonate polymers. According to the present invention a range of carbonate polymer blend compositions can be prepared to take advantage of the improved combinations of processability and improved properties obtainable in shaped articles. In general, it has been found suitable to employ the first high molecular weight branched component in the carbonate polymer blend compositions in amounts of at least about 0.1 weight percent, desirably at least about 1 weight percent, preferably at least about 2 weight percent and more preferably at least about 3 weight percent, said weight percentages being based upon total amount of the two carbonate polymer components in the blend compositions. In order to maintain processability and thermal plasticity, the high molecular weight, branched component is employed in amounts less than or equal to about 50 weight percent, preferably less than or equal to about 35 weight percent, and more preferably less than or equal to about 25 weight percent.

When using arylcyclobutene terminated carbonate polymers as the precursor component for the high molecular weight branched carbonate polymer component, it has been found desirable to incorporate the arylcyclobutene-containing polymer in amounts sufficient to provide increased shear sensitivity in the resulting polymer. It is generally desired to employ such polymer in amounts of at least about 1, preferably at least about 2, more preferably at least about 3 and most preferably at least about 4 weight percent by weight arylcyclobutene-containing carbonate polymer in the preparation of composition according to the present invention. In general it has been found that the advantageous property combinations can be obtained using arylcyclobutene terminated carbonate polymers in amounts up to and including about 40, preferably up to and including about 30, more preferably up to and including about 25, and most preferably up to and including about 20 percent by weight based on the combined weight of the precursor and second carbonate polymer components.

The carbonate polymers suitable for use as the second, lower molecular weight carbonate polymer component are generally well known in the literature and a large number are commercially available. In general, these are preferably carbonate polymers prepared from one or more dihydric components by reacting the dihydric compound, such as a diphenol, with a carbonate precursor such as phosgene, a haloformate or a carbonate ester such as diphenyl or dimethyl carbonate. Aromatic carbonate polymers are preferred and aromatic diphenols are preferred dihydric compounds with the preferred diphenols including but not limited to 2,2-bis(4-hydroxyphenyl)-propane (i.e., bisphenol A); phenol, 4,4'-(9-H-fluorene-9-ylidene)bis (i.e., bishydroxyphenylfluorene); 4,4'-thiodiphenol (TDP); 1,1-bis (4-hydroxyphenyl)-1-phenyl ethane (bisphenol AP); phenolphthalein; bis (4-hydroxyphenyl) diphenyl methane; tetrabromobisphenol A (TBBA); and tetrachlorobisphenol A (TCBA).

These lower molecular weight carbonate polymers can be prepared from such materials by any of several known processes such as the known interfacial, solution or melt processes. As is well known, suitable chain terminators (typically monophenolic compounds) can be employed to obtain the desired molecular weight in the lower molecular weight component. Optionally, branched carbonate polymers can be employed as the second, lower molecular weight carbonate polymer component. These products are known and are prepared using the typical branching agents such as multihydric compounds having three or more hydroxy groups, such as phenols having three or more hydroxy groups. Generally, however, the linear carbonate polymers are preferred for use as the second, lower molecular weight component where the improvement in shear sensitivity is more noticeable with addition of the high molecular weight branched component.

The carbonate polymers suitable for use as the second, lower molecular weight carbonate polymer component in the present invention also include carbonate polymers prepared from two or more different multihydroxy compounds, preferably dihydroxy compounds, and preferably phenols, or a combination of a multihydroxy compound, such as a diphenol, and a glycol or a hydroxy- or acid-terminated polyester or a dicarboxylic acid in the event a carbonate copolymer or heteropolymer is desired. It is also possible to employ multifunctional carboxylic acids or derivatives, especially aromatic carboxylic acids including their acid chlorides, and prepare poly(ester-carbonate) resins such as the known aromatic poly(ester-carbonates) The known silicon-containing multihydric monomers can also be used to prepare silicon-containing carbonate polymers that are suitable for use in the blends according to the present invention. Also suitable for use as the second, lower molecular weight carbonate polymer components for practice of the invention are blends of two or more of the above-described lower molecular weight carbonate polymer components.

For purposes of obtaining desired property combinations, it has been found that the second, lower molecular weight carbonate polymer component should have a weight average molecular weight of at least about 10,000, preferably at least about 13,000, more preferably at least about 15,000 and most preferably at least about 17,000. In order to keep the desired level of polymer melt flow and processability it has been found that the second, lower molecular weight carbonate polymer component should preferably have a weight average molecular weight of no more than about 60,000, preferably no more than about 55,000, more preferably no more than about 50,000, most preferably no more than about 40,000.

It is understood that the second, lower molecular weight components suitable for use according to the present invention may be a single component carbonate polymer directly obtained from a polymerization process. On the other hand, commercially available carbonate polymers which will be suitable for use as the second, lower molecular weight component are often actually a combination of two or more different carbonate polymer components of differing molecular weights and melt flow rates. It is obviously necessary for carbonate polymer suppliers to provide the broad range of potential customers and applications with an equally broad range of different carbonate polymer products that vary in their balance of processability (i.e., melt flow rate) and performance properties. However, a polymerization facility can produce only a limited number of different polymers, typically near the higher and lower molecular weight extremes. These polymers are then blended to obtain the desired intermediate melt flow rate product. These types of products, will then have an average molecular weight which would then be determinative of their suitability for use as the lower molecular weight second carbonate polymer component in the blend compositions according to the present invention. It is also known that "branched polymers" such as the HMWB carbonate polymers used in the blends according to the present invention comprise only a portion of polymer molecules that are actually branched, the balance being essentially linear. However, as used herein, the term branched carbonate polymer refers to the entire polymer component and not just to the fraction of the molecules of that component that are actually branched.

In preparing the blend compositions according to the invention it is important to employ mixing techniques that result in sufficient mixing of the two components, preferably obtaining a thorough, generally homogeneous mixing of the two components. Suitable processes are generally known to those skilled in this area, examples of techniques that can be used to homogeneously mix the first or precursor component with the second component include solution blending and melt blending in known melt mixing equipment such as single or twin screw extruders, molding equipment, Banbury mixers or the like.

A further aspect of the invention, as mentioned above, is an improved process for preparing the disclosed carbonate polymer blends comprising the steps of (a) preparing a precursor component capable of forming the first high molecular weight branched carbonate polymer component, said precursor component comprising a carbonate polymer containing latent thermally activated reactive moieties; (b) combining the precursor component with the second carbonate polymer; and (c) themally activating the latently reactive moieties of the precursor component during or after their combination to provide a generally homogeneous carbonate polymer blend composition.

The combination of the precursor and second components can be done by solution blending using known solvents and techniques. The first component precursor can also be combined with the second carbonate polymer by dry blending or dual feeding the precursor and second components. As known, dry blending involves combining and mixing the polymer in the form of powder, pellets, flakes or similar unmelted form. Dual feeding is performed using a K-tron brand feeder, a screw feeder, a weigh belt feeder or the like to separately convey the resins in an unmelted form to the inlet(s) or feed port(s) of a melt mixing device. Then, the dry mixture or dual feeds are supplied to an extruder or other melt mixing device. As noted, the combining step (b) can be done at a temperature and/or for a time sufficient for the latently themally reactive moieties to become significantly activated and reacted to form the HMWB PC component, providing the blend composition which can be used in appropriate applications.

Another process aspect involves combining the precursor component in step (b) with the second carbonate polymer component at a temperature and for a time less than sufficient to significantly themally activate the latently thermally reactive moieties and (3) recovering an intermediate carbonate polymer blend composition. The intermediate resin blend would then contain both the the precursor component and the second carbonate polymer component. The intermediate could be further processed and/or shaped prior to, during or subsequent to the thermal activation of the latent reactive moieties. Another process aspect involves thermal activation of the latently reactive moieties of the precursor component in an extrusion or molding step to directly provide a shaped article prepared from the claimed carbonate polymer blend composition.

In this way, this preferred process provides an intermediate carbonate polymer blend composition comprising a carbonate polymer precursor component having one or more latently reactive moieties which component is capable of forming a high molecular weight branched carbonate polymer upon heat activation and a second, different carbonate polymer component having a lower molecular weight than the high molecular weight branched component. A further preferred embodiment involves incorporating latently thermal reactive moieties in the first carbonate polymer component precursor in an interfacial polymerization process.

In addition, when using a carbonate polymer precursor component that has latent reactive moieties and premixing the precursor with the second polymer component, it is important to perform the mixing under appropriate conditions to assure that there is good mixing of the polymers as the polymers melt. In particular, it is desirable if the molecular weights, and physical forms and sizes (i.e., pellets, flake, powder, etc.) of the polymers are selected to be within respective ranges so that both components begin to melt at about the same point in the melt mixing process. In this way, the precursor polymer will then be more homogeneously mixed to form a better intermediate. Otherwise, if preparing the high molecular weight branched component directly, the precursor polymer will then be more homogeneously mixed and dispersed by the time the themally activated latent reactive moieties began to inter-react. For example, if attempting to mix a powder form of precursor polymer with a pellet form of the second polymer component, the powder form precursor polymer may tend to melt more quickly and might begin inter-reaction prior to thorough melt mixing with the second component. Unless the process temperature is maintained sufficiently low, this may lead to undesirably large gels or domains of high molecular weight or crosslinked polymer. This can be prevented by using a second component which is similarly in powder form and/or has a lower molecular weight and/or lower glass transition temperature (Tg).

The blend compositions according to the present invention are particularly well suited for applications that take advantage of the surprisingly good combinations of shear sensitivity, processability and melt strength. The blend compositions according to the invention exhibit a relatively high melt strength or high melt viscosity at low shear conditions and are unexpectedly easily processed at standard shear rates generated by typical melt processing equipment. This means that they are especially well suited for applications such as fiber forming, blow molding, thermoforming or profile sheet production where reasonably high melt strength is needed.

In a related aspect, the present invention is also an improved process for preparing a fiber comprising the step of forming a fiber from a blend as described above, comprising the high molecular weight branched carbonate polymer component. Fiber forming process that can be applied to carbonate polymers are generally known to those skilled in the art and the use of the high melt strength carbonate polymer compositions according to the present invention provides an improvement in terms of melt strength, reduced necking and maintaining fiber diameter in very thin fibers. As also known to those skilled in the art, the term "fiber" when used in connection with carbonate polymers refers to strands that have a diameter of from about 0.1 to about 1.5 millimeter and a length of at least about 2 millimeters.

A further aspect of the blend compositions according to the present invention is the surprisingly good drip resistance under flame testing conditions, leading to the improved ignition resistance properties of these blends. One of the criteria in ignition resistance testing is resistance to the tendency to generate flaming drips of molten polymer under test conditions. In actual fire situations the molded plastic part is then believed to be less likely to spread a fire to other fuel sources. Polytetrafluoroethylene antidrip additives (Teflon) are known but their incorporation into carbonate polymers requires additional, complicated processing steps and has a detrimental effect on other polymer properties, particularly impact resistance and transparency.

The polymer compositions according to the invention are surprisingly resistant to the dripping characteristic and can be advantageously used where ignition resistance properties are desired. Optionally, transparent, ignition resistant, carbonate polymer blend compositions can be obtained using a high molecular weight branched carbonate polymer drip reducing additive together with a second different carbonate polymer having a lower molecular weight than the high molecular weight branched component. It should be noted that other optional ignition resistance additives must be properly selected to maintain the desired levels of light transmission and haze if transparency is intended. These blends can be used to prepare improved shaped articles having good combinations of light transmission (transparency or translucency) and ignition resistance. Preferably, blends and articles can be prepared according to the invention wherein the ignition resistance of the blend, when tested according to UL 94 is rated at least V-O at ⅛ inch (3.175 mm) or is more ignition resistant (e.g., rated 5-V at ⅛ inch). In a another embodiment, the high molecular weight branched carbonate polymer drip reducing additive is formed under ignition conditions from a precursor component capable of forming a high molecular weight branched carbonate polymer upon heat activation.

As mentioned, additional ignition resistance additives can be employed at appropriate levels where the desired levels of light transmission and low color are maintained. Such additives can include halogenated carbonate polymers and oligomers, such as brominated polycarbonates and oligocarbonates and inorganic and organic salts or alkali and alkali earth metals.

A further aspect of the blends according to the present invention is that the high molecular weight branched component can be employed to provide light diffusing and gloss controlling effects, if such effects are desired and if appropriate processing conditions are employed. Many applications for opaque carbonate polymers, such as automotive parts, desire a controlled gloss or matte finish on the surface of the molded part. Other applications desire varying degrees of light transmission together with light diffusing effects. Such applications include frosted, mottled, semi-transparent or translucent parts like fluorescent lighting diffusers, shower doors and non-glare glazing for picture frames.

It has surprisingly been found that the blends according to the present invention can produce such light diffusing or controlled gloss effects and maintain sufficient levels of light transmission. The amount of gloss reduction/light diffusion has been found to be a function of the amount of the high molecular weight branched component, particularly when a latent reactive arylcyclobutene moiety is being used to provide the branching. It has also been found that the use of high shear melt processing of the blend into molded parts, such as when injection molding, will provide the greatest reductions in the gloss and/or light diffusing effects in the parts. When a latent reactive arylcyclobutene moiety is being used to provide the branching, high shear melt processing of the blend into molded parts at or above temperatures required for thermal activation of the arylcyclobutene moiety provide the greatest reductions in the gloss and/or light diffusing effects in the parts. This reduces the need for special surface treatment of the molds or for subsequent surface treatment steps for the molded articles.

As used herein, the term "reduced gloss" means that the incorporation of the high molecular weight branched component results in a molded article having lower gloss than an article molded under the same conditions from the same composition not containing the high molecular weight branched component. In general, "low gloss" polymer or resin, as used herein, refers to a polymer or resin, when molded into plaques and tested for gloss according to ASTM D-523-85 exhibits 60° gloss values of less than about 70%, preferably less than about 60%.

As used herein the term "transparent" means that molded articles have a measured total light transmission value according to ASTM D-1003 of at least about 40%, more preferably at least about 60%, more preferably at least 80% and a diffused light transmission value of less about 7%, preferably less than about 5%. As used herein the terms "semi-transparent", "frosted", "mottled" and "translucent" are generally synonymous and mean that molded articles have a measured diffused light transmission value according to ASTM D-1003 of at least about 7%, more preferably at least about 15% and most preferably at least about 20% and would have a total light transmission value of at least about 40%, more preferably at least about 50% and most preferably at least about 60%.

Previously, in order to obtain light diffusion/reduced gloss effects in articles prepared from carbonate polymers that were transparent, semi-transparent or translucent it had been necessary to use additional process features or incorporate additives which had a detrimental effect. For example, when using a mold with roughened or embossed surface to provide such effects, the surface of the mold tends to wear out unevenly with time. Incorporating gloss reducing fillers normally causes the material to lose impact and light transmission properties. The present invention provides a composition and process that do not have these disadvantages and can produce these effects in shaped articles prepared by extrusion, blow molding, thermoforming or injection molding techniques with a smooth surface mold and without a subsequent gloss reducing surface treatment. Obviously further surface modifications can also be obtained using known surface treatments.

In a further embodiment of the present invention, the controlled gloss, transparent, semi-transparent or translucent articles could also be obtained using another additive having sub-micrometer size particles at low levels such that the desired physical properties are not detrimentally affected while the desired light transmission and controlled gloss are obtained.

A further aspect of the present invention is the ability to employ recycle, regrind, contaminated and/or scrap carbonate polymer as all or part of the second, carbonate polymer component and effectively upgrade those types of materials with the high molecular weight branched component. As known by the producers and users of thermoplastic carbonate polymers, the typical processes for preparing these polymers or resins and for preparing molded, extruded or otherwise shaped articles tend to produce varying amounts of recycle, regrind, contaminated and/or scrap carbonate polymer. As used herein, this refers to polymer or resin which has undergone a change or loss in the physical, rheological or optical properties versus the optimized properties typically possessed by the resin when it is initially extruded and pelletized. This degradation can be brought about by a number of conditions such as prolonged air exposure of the high temperature melt and repeated melt plastifications.

As known, these conditions, particularly in the presence of contaminants or impurities such as pigments, paints, coatings and additives, can degrade the polymer molecular weight and cause change or loss of physical, rheological or optical properties. Typically, the recycle, regrind, contaminated and/or scrap carbonate polymer has been rejected for one or more of these reasons. The incorporation of the high molecular weight branched component, particularly by incorporation of a precursor component, either at the extruder or molding machine, can restore these properties and/or upgrade the resin to make it suitable for use in the same or different shaping processes. In general, it has been found that all or part of the second carbonate polymer in the compositions according to the present invention can be a recycle, regrind, contaminated and/or scrap carbonate polymer. In particular, the second carbonate polymer in the blends according to the present invention can employ at least about 5, preferably at least about 10 and more preferably at least about 30 weight percent recycle, regrind, contaminated and/or scrap carbonate polymer.

In addition to the high and lower molecular weight components, and provided that the desired property combinations are maintained to a satisfactory degree, the carbonate polymer compositions according to the present invention can advantageously contain the standard types and amounts of the additive-type components frequently incorporated into carbonate polymers. These components can include ignition resistance additives, fillers (i.e., glass fibers, talc, clay, etc.), pigments, dyes, antioxidants, heat stabilizers, ultraviolet light absorbers, mold release agents, impact modifiers, antistatic additives, flow aids, lubricants, additive for reducing melt fracture and the other additives commonly employed in carbonate polymer compositions.

EXPERIMENTS

The following Experiments are given to further illustrate the invention and should not be construed as limiting its scope. In the following Experiments, all parts and percentages are by weight unless otherwise indicated.

Preparation of a Benzocyclobutene-terminated Polycarbonate ("BCB PC")

Benzocyclobutene-terminated polycarbonates ("BCB PC"), precursor components having latently reactive arylcyclobutene moieties capable of forming a high molecular weight branched carbonate polymer upon heat activation, were initially produced by the following interfacial process. A glass reactor was fitted with a mechanical stirrer, a baffle, a thermometer, a pH electrode connected to a pH meter/controller, a liquid inlet tube, a gas inlet tube and a gas outlet tube connected to a phosgene scrubber, the scrubber containing an aqueous solution of 50 weight percent sodium hydroxide and about 1 percent by weight triethylamine. To the reactor was added 68.5 weight parts (0.3 mole parts) bisphenol A, 2.16 weight parts (0.018 mole parts) 4-hydroxybenzocyclobutene (BCB-OH), 360 weight parts water and about 240 weight parts dichloromethane.

While stirring the reaction mixture there were added 48 weight parts (0.6 mole parts) of sodium hydroxide in a 50 weight percent aqueous solution followed by the addition of 37 weight parts (0.375 mole parts) of gaseous phosgene at a rate of about 1 weight part per minute. The sodium hydroxide addition was maintained as needed to maintain a pH of about 12.5. Following the phosgene addition, 515 weight parts dichloromethane and 0.3 weight parts (1 mole percent) triethylamine were added. The reaction mixture was agitated for 20 minutes to produce a bisphenol A polycarbonate resin terminated with benzocyclobutene moieties. The pH of the mixture was reduced to about 7 by the addition of 9 weight parts of phosgene. The polymer solution was washed with 1N HCl and with water and the polymer was then isolated.

The polymer molecular weight was determined by gel permeation chromatographic (GPC) analysis, the weight average molecular weight (Mw) being 18,190. Liquid chromatographic analysis of the reaction mixture residue showed complete reaction of the 4-hydroxybenzocyclobutene. The resulting polycarbonate, before any crosslinking, was therefore determined to contain 0.06 moles benzocyclobutene per mole bisphenol A and have a degree of polymerization of about 27.

The terminal location of the benzocyclobutene moieties was determined by reverse phase liquid chromatography using the conditions described by D. J. Brunelle et al., "Remarkable Selective Formation of Macrocyclic Aromatic Carbonates: Versatile New Intermediates for the Synthesis of Aromatic Polycarbonates", J. of Am. Chem. Soc. (1990) vol 112, p. 2399. A bonded silica column using tetrahydrofuran/water gradient was employed to separate oligomer components. Their retention times and UV spectra were compared to determine the types of oligomer end groups.

Using the process as described above and adjusting the amounts of aqueous sodium hydroxide, water, phosgene and methylene chloride, two additional arylcyclobutene terminated aromatic carbonate polymers were prepared having the molecular weights and arylcyclobutene concentrations as shown in Table I. In Table I the ratio of the moles hydroxybenzocyclobutene to the moles of bisphenol A in the polymer is shown as "Mole Ratio." As shown in Table I, varying the amounts of BCB-OH results in the indicated range of polymer compositions and molecular weights. The table shows molecular weight (Mw) of the resulting BCB PC which is the precursor to the high molecular weight branched carbonate polymer (HMWB PC) as well as the molecular weight of the HMWB PC component that resulted from reaction of that BCB PC.

The Mw of the resulting HMWB PC was determined by GPC analysis of the molecular weight distribution of blend compositions after the BCB PC had been fully reacted to form the HMWB PC. For the purposes of these tests, 20 weight percent of the 0.03 m/m BCB PC was blended with 80 weight percent of a 20 MFR linear PC, while 7 and 3.5 weight percentages of the 0.06 and 0.1 m/m BCB PC's, respectively, were blended with the balance of a 13 MFR PC resin. Then, the latently reactive BCB moieties of the precursor component were thermally activated to provide a homogeneous carbonate polymer blend composition containing the HMWB PC. The blend was analyzed by GPC and the high molecular weight portion of the molecular weight distribution curve was mathematically analyzed to determine the Mw of the HMWB PC component.

TABLE I

High Molecular Weight Branched Polycarbonates ("HMWB PC")

| No. | Branching Agent | | Mw | |
| | Type | (Mole Ratio) | Before Reaction (Precursor) | After Reaction (HMWB PC) |
| --- | --- | --- | --- | --- |
| A | BCB | 0.03 | 31,894 | 99,100 |
| B | BCB | 0.06 | 18,190 | 676,500 |
| C | BCB | 0.1 | 11,634 | 234,000 |

These or similar BCB PC polymers were used to prepare the HMWB PC components in the blends prepared below.

Table II below summarizes the series of second, lower molecular weight polycarbonate resins that are used in preparing the example and comparison blend compositions.

TABLE II

Lower Molecular Weight Polycarbonates

| No. | Type | Mw | MFR |
| --- | --- | --- | --- |
| I | Linear | 36,000 | 3.5 |
| II | Linear | 32,000 | 6 |
| III | Linear | 26,500 | 13 |
| IV | Linear | 24,000 | 20 |
| V | Linear | 19,000 | 60 |
| VI | Linear | 18,000 | 80 |
| VII | Branched | 36,000 | 2.5 |

The blend compositions that are shown in the following tables were prepared as indicated. The HMWB PC component precursors based on the BCB PC used in these and subsequent experimental compositions was observed to have blended homogeneously with the second component. Also, in the final products, the HMWB PC components based on the BCB PC were observed to form homogeneous blends with no visually observable phase separated components in the resulting blend compositions. Analysis of the mixtures for insoluble crosslinked polycarbonate gave 3 percent or less by weight. For all of the blends shown in the tables, the Tg was about 150° C. Then, as shown, parts were successfully molded from the blend compositions and were tested according to the indicated methods with the results reported below.

For measurement of the "Melt Strength" the following test was used, as described in U.S. Pat. No. 5,094,806. ASTM Type I tensile bars (see ASTM designation D 638-87b) are prepared by injection molding on a 70 ton Arburg molding machine. Mold temperatures in the range of 150° F.–175° F. (65°–80° C.), are used in molding the tensile bars from the various compositions. Various amounts of weight are attached to one of the ends of each of the predried tensile bars and the bars are hung vertically in a forced air oven for 5 minutes at a temperature of about 200° C. or 175° C. (as indicated in the respective table), which is about comparable to the melt temperature at which these compositions would be blow molded. The weight reported as the "melt strength" or "Equil. Load (Grams)" for each sample is the amount of weight which could be attached to the bar before it showed any detectable elongation under these conditions at the selected temperature. The dramatic increase in the amount of weight which a tensile bar can support without elongation at elevated temperatures, resulting from the presence of a high molecular weight branched polymer component, can be clearly seen from the following data.

As used herein the term "DTUL" is the deflection temperature under a load of 264 psi as measured according to ASTM D 648-82. Flexural modulus is measured according to ASTM D 790-84a and the tensile strength and the elongation are measured according to ASTM D 638-84. Where reported, the notched Izod impact strength is measured on a test bar sample having dimensions of ½ inch by 2½ inches (12.7 mm by 63.5 mm) and having a notch of 10 mil (0.0254 mm) according to ASTM D 256-84. The melt flow rate (MFR) values are measured according to ASTM D 1238-85, conditions of 300° C. and 1.2 kilograms mass and are reported in grams per 10 minutes (gr/10 min).

Melt Strength of Blend Compositions

Blend compositions were prepared as indicated in Table III below containing a lower Mw base PC resin in powdered form and a BCB PC component (in flake form) to provide the HMWB PC. The indicated components were dry blended, then melt mixed on a 1½ inch (38 mm) single screw Killion extruder at a temperature of about 430° F. (220° C.) and pelletized. At this point the BCB moieties were not yet significantly reacted and the HMWB PC was not yet formed. The intermediate blend composition obtained can be further processed, by injection molding, for example, into shaped articles. The HMWB PC component can then be obtained prior, during or subsequent to the processing into the desired shaped article. For the melt strength test samples, the BCB PC was then reacted to form the HMWB PC during the injection molding step when the blend composition was injection molded into test bars at a temperature of about 305° C.

forming a portion of the high molecular weight branched component by the heat treatment.

To this blend composition were added the following ignition resistance additives: (0.1% by weight potassium N-(p-tolylsulfonyl)-p-toluene sulfimide (KPTSM), 0.1% by weight hydrogen N-(p-tolylsulfonyl)-p-toluene sulfimide (HPTSM) 1.0% by weight BC-52 brand brominated oligocarbonate. The additives were incorporated by blending and extruding at 311° C. on a 30 mm WP twin screw extruder. At this point the BCB PC was found to be fully reacted to have formed the high molecular weight branched component by the heat treatment. This composition was molded into test bar samples at 340° C. on a 70 ton Arburg molding machine at a mold temperature of 180° F. (82° C.). The HMWB PC component was observed to have blended homogeneously with the second component. These samples were then evaluated and the following properties were observed:

TABLE IV

| Ignition Resistant Composition Properties | |
|---|---|
| Izod (10 mil notched) | 15.2 ft lbs (800 J/m) |
| Izod (unnotched, weldline) | no break |
| Tensile strength (at break) | 9071 psi (64MPa) |
| Elongation (at break) | 90% |
| UL-94 rating at 1/16 inch (1.6 mm) | V-0 |

This composition is an improvement over compositions which utilize Teflon as an antidrip agent to obtain V-O rating

TABLE III

Blend Composition Melt Strength

| Blend Comp. No. | HMWB PC (BCB-TYPE) | | | Lower Mw Base PC | | | | Product Melt Strength Equil. Load (Grams) at 200° C. |
|---|---|---|---|---|---|---|---|---|
| | Wt % | Mole % BCB | Mw** | Wt % | Type *** | PC MFR | Mw | |
| 1* | 0 | — | — | 100 | Lin | 13 | 26,500 | 2 |
| 2* | 0 | — | — | 100 | Lin | 3.5 | 36,000 | 12 |
| 3* | 0 | — | — | 100 | Br | 2.5 | 36,000 | 36 |
| 4 | 5 | 0.06 | 18,000 | 95 | Lin | 13 | 26,500 | 56 |
| 5 | 7 | 0.06 | 18,000 | 93 | Lin | 13 | 26,500 | 116 |
| 6 | 9 | 0.06 | 18,000 | 91 | Lin | 13 | 26,500 | 200 |
| 7 | 3.5 | 0.1 | 11,000 | 96.5 | Lin | 13 | 26,500 | 50 |
| 8 | 5 | 0.1 | 11,000 | 95 | Lin | 13 | 26,500 | 76 |

*Not an example of the present invention
**As measured before reaction
***Lin = linear, Br = branched As can be seen, the blend compositions according to the invention have improved melt strength properties over the linear PC base resin and over a branched PC resin not containing a high molecular weight branched carbonate polymer component.

Ignition Resistance of Blend Compositions

A blend composition was prepared comprising 5 percent by weight of a first, high molecular weight branched component based on flake BCB PC (0.1 m/m BCB, 10,000 mol wt) and 95% by weight of a second, lower molecular weight polycarbonate component of powdered polycarbonate having a molecular weight of 26,500. These components were initially dry blended as powders and extruded at 280° C. on a 30 millimeter Werner and Pfleiderer (WP) twin screw extruder and pelletized. At this point the BCB PC was found by liquid chromatographic analysis to be partially reacted, since the use of Teflon produces an opaque blend and results in a loss of impact properties.

Controlled Gloss Compositions

The compositions shown in Table V were prepared by dry blending the indicated powdered linear PC and flake BCB PC components and melt mixing on a 30 mm co-rotating twin screw WP extruder at 230° C. and recovering the pelletized intermediates with the HMWB PC not believed to be significantly formed. Test plaques were then molded on a 70 ton Arburg injection molding machine at 320° C. with a mold temperature of 150° F. This process provided moderate to high shearing during the melt extrusion and flow into the mold. The gloss measurements are performed according to ASTM D-523-85 using a Dr. Lange Reflectometer RB3 model test apparatus from Hunter Associates.

TABLE V

Controlled Gloss Properties Comparison

| Composition No. | 9* | 10 |
|---|---|---|
| PC (21,000 mol wt, linear) | 2000 gm | 1800 gm |
| BCB-PC (18,000 mol wt)** | 0 | 200 gm |
| Carbon black | 4 gm | 4 gm |
| Properties | | |
| 20° gloss | 85 | 6 |
| 60° gloss | 101 | 20 |
| 85° gloss | 99 | 53 |
| Izod (10 mil Notched) | 2.5 ft/lbs (132 J/m) | 10 ft/lbs (535 J/m) |

*Not a sample of the present invention
**Prior to reaction; 0.06 Mole/Mole BCB

As can be seen, the added HMWB PC provided excellent gloss reduction while actually improving the product toughness.

Translucent Compositions

The following compositions were prepared and tested for translucence. In preparing the Blend No. 11 formulation, 72.2 weight percent of the 18,000 Mw linear PC pellets and 27.8 weight percent of powdered 26,500 Mw linear PC were dry mixed, extruded on a Werner and Pfleiderer 30 mm co-rotating twin-screw extruder at 230° C. and pelletized. In preparing the Blend No. 14 formulation, 65 weight percent of the 18,000 Mw PC pellets, 25 weight percent of powdered 26,500 Mw linear PC and 10 weight percent of the 18,000 Mw (0.06 m/m) BCB-PC flake were mixed in the same fashion as was used to prepare Composition 11. In preparing blend formulations numbered 12 and 13 in the following Table VI, 75 and 50 weight percent, respectively, of the 18000 Mw linear PC were combined with a premix of 25 and 50 weight percent respectively of Blend No. 14 by dry blending at the molding machine.

Blend No. 15 was prepared in the same fashion as Blend 11 using 90 weight percent of the 21,600 Mw branched PC pellets and 10 weight percent of the 18,000 Mw (0.06 m/m) BCB-PC flake. For the Blend No. 16 formulation, 60 weight percent of the 18000 Mw linear PC pellets, 20 weight percent of powdered 26,500 Mw linear PC and 20 weight percent of the 18,000 Mw (0.06 m/m) BCB-PC flake were blended using the same process as used with Blend 11.

The compositions were dried at 120° C. for 4 hours prior to molding on a 70 ton Arburg molding machine set at 305° C. A smooth surfaced ASTM mold set at 175° F. (80° C.) was used to mold 2.5 inch (63.5 mm) disks, tensile bars and DTUL bars which were evaluated as removed from the mold without any subsequent gloss reducing surface treatment. The following measurements were made on a Color Quest instrument from Hunter Associates Laboratory according to ASTM D-1003. As used in Table VI, these terms have the indicated meanings:

Diffuse Transmission: Process by which incident light, while being transmitted through an object, is redirected or scattered over a range of angles.

Regular Transmittance: Process by which incident light is transmitted through an object in a linear, straight through manner, without diffusion.

Total Transmission: Diffuse Transmission+Regular Transmission $$\% \text{ Haze} = \frac{\% \text{ Diffuse Transmission}}{\% \text{ Total Transmission}} \times 100$$

TABLE VI

Translucent Properties

| Blend No. | HMWB PC (BCB PC) Wt % | Lower Mw Base PC Wt % | Type | Mw | Total (%) | Diffused (%) | Haze (%) | UL-94 (⅛ inch) |
|---|---|---|---|---|---|---|---|---|
| 11* | 0 | 72.2 | Lin | 18,000 | 89.9 | 0.8 | 0.9 | Fail |
|  |  | 27.8 | Lin | 26,500 |  |  |  |  |
| 12 | 2.5 | 91.25 | Lin | 18,000 | 86.9 | 27.9 | 31.9 | V-2 |
|  |  | 6.25 | Lin | 26,500 |  |  |  |  |
| 13 | 5 | 82.5 | Lin | 18,000 | 88.3 | 40.3 | 45.4 | V-0 |
|  |  | 12.5 | Lin | 26,500 |  |  |  |  |
| 14 | 10 | 65 | Lin | 18,000 | 86.5 | 55.0 | 63.6 | V-0 |
|  |  | 25 | Lin | 26,500 |  |  |  |  |
| 15 | 10 | 90 | Br | 21,600 | 86.7 | 54.1 | 62.3 | V-0 |
| 16 | 20 | 60 | Lin | 18,000 | 77.3 | 58.2 | 75.2 | Fail |
|  |  | 20 | Lin | 26,500 |  |  |  |  |

*Not an example of the present invention.

As can be seen, the HMWB PC component results in large increases in the light diffusing properties of these compositions. Surprisingly, there is additionally a simultaneous improvement in ignition resistance for most of the compositions. In comparing the effects of a HMWB PC to a lower molecular weight branched PC with regard to light diffusing ability and melt strength, various compositions were evaluated as shown in Table VII. For Composition No. 18*, 95 weight percent of the 18,000 Mw linear PC pellets and 5 weight percent of 36,500 Mw branched PC were dry mixed and extruded on a Werner and Pfleiderer 30 mm co-rotating twin-screw extruder at 235° C. and pelletized. In preparing Composition No. 19*, 90 weight percent of the 18,000 Mw linear PC and 10 weight percent of 36,500 Mw branched PC were dry mixed and extruded on a Werner and Pfleiderer 30 mm co-rotating twin-screw extruder at 240° C. and pelletized. In preparing Composition No. 20, 95 weight percent of the 18000 Mw linear PC and 5 weight percent of 18,000 Mw BCB-PC flake were dry mixed and extruded on a Werner and Pfleiderer 30 mm co-rotating twin-screw extruder at 230° C. and pelletized. In preparing Composition No. 21, 90 weight percent of 18000 Mw linear PC pellets and 10 weight percent of 18,000 Mw BCB-PC flake were combined according to same process as used for Composition No. 20.

The compositions were all dried at 120° C. for four hours prior to molding on a 70 ton Arburg molding machine at 310° C. A smooth ASTM mold set at 175° F. (80° C.) was used to mold 2.5 (63.5 mm)inch disks, tensile bars and DTUL bars. The light transmission tests were the same as performed for the preceding Table VI compositions. The melt strength tests were the same as performed above for the Table III compositions but at 175° C., a slightly lower temperature.

cated times and analyzed by GPC for molecular weight (Mw or weight average, Mn or number average, and Mz or "z" average), by UV spectrophotometry for total absorbance at 288 nm ("Abs. 288 nm"), and visually for color (see Table VIII). Heating the control PC for 40 min. at 300° C. produced no significant change in molecular weight or color. The BCB PC/PC blend showed a rapid increase in molecular weight as the BCB PC fraction reacts to form the HMWB PC, after which the polymer molecular weight does not significantly change (less than 5% change in Mw). The color of the BCB PC/PC alloy remains low throughout the test, becoming slightly yellow, but not dark or brown in color. It can therefore be seen that these HMWB PC components and the resulting blend compositions according to the invention are thermally stable at a temperature 100° C. above the Tg of the carbonate polymer blend composition, which was about 150° C. in this case.

TABLE VII

Higher versus Lower Mw Branched PC

| Comp. No. | Branched PC Wt % | Type | Light Transmission Properties Total (%) | Diffuse (%) | Haze (%) | Melt Strength Equil. Load (Grams) at 175° C. |
|---|---|---|---|---|---|---|
| 17* | 0 | — | 88.5 | 0.4 | 0.4 | 0 |
| 18* | 5 | Low Mw | 89.7 | 0.6 | 0.5 | 1 |
| 19* | 10 | Low Mw | 90.5 | 1.0 | 1.1 | 5 |
| 20 | 5 | High Mw | 89.1 | 7.3 | 8.2 | 60 |
| 21 | 10 | High Mw | 86.4 | 49.9 | 57.8 | >635 |

*Not an example of the present invention.

As can be seen, the HMWB PC provides much larger benefits than lower molecular weight branched PC with regard to both light diffusing properties and melt strength.

Blend Composition Thermal Stability Evaluation Heat testing a blend of a HMWB PC (based on BCB PC) with a lower molecular weight polycarbonate shows that the BCB PC based materials provide HMWB PC components with excellent thermal stability as shown in Table VIII below. These tests were conducted on polymer films prepared from dichloromethane solutions of a blend comprising 20 wt. % 0.06 m/m BCB PC and 80 wt. % of an MFR linear PC. The blends were prepared by solution blending the components in the dichloromethane at room temperature with the HMWB PC being formed by the reaction of the BCB during a 6 minute heating period up to 300° C. The blends all had Tg values of about 150° C.

The film samples of the alloys and PC controls were exposed to heating at 300° C. under nitrogen for the indi-

TABLE VIII

Carbonate Polymer Heat Stability Properties

| Polymer | Min @ 300° C. | Mn | Mw | Mz | disp | Abs. 288 nm | Color |
|---|---|---|---|---|---|---|---|
| No. 22* | 0 | 11392 | 26217 | 39891 | 2.30 | 100 | clear |
| 13.5 MFR Lin PC | 40 | 12414 | 29270 | 70477 | 2.36 | 175 | clear |
| No. 23 | 0 | 8045 | 18749 | 34974 | 2.33 | 106 | clear |
| 80% Lin PC | 3 | 8453 | 20460 | 52757 | 2.42 | 204 | clear |
| (80 MFR)/20% | 6 | 9144 | 31891 | 130553 | 3.49 | 287 | clear |
| HMWB PC | 10 | 9676 | 33039 | 128080 | 3.41 | 250 | clear |
| | 20 | 8760 | 31587 | 152227 | 3.61 | 431 | light |
| | 40 | 9243 | 30777 | 125220 | 3.33 | 386 | yellow |

*Not an example of the present invention.

Effects of Various Molecular Weights and Branching Degrees in the HMWB PC

The compositions shown in Table IX were prepared by solution mixing of the indicated BCB PC with a 22 MFR linear PC in dichloromethane at room temperature followed by precipitation with hot water (90°–100° C.) followed by compression molding starting at 200° C. and heating to 300° C. The BCB PC was reacted to form the HMWB PC during this molding. The HMWB PC components were prepared from the indicated BCB PC's (from Table I).

As can be seen in Table IX below, the higher concentrations of the HMWB PC component (the greater degrees of branching) significantly increase the low shear viscosity as that term is used herein. The values for shear sensitivity, $\eta/\eta$ (0.3/10), are a unitless ratio of the viscosity measurements as determined by dynamic mechanical spectroscopy at 280° C.

TABLE X

Effect of HMWB PC Concentration on Rheological and Impact Properties

| | HMWB PC | | | | Base PC | | Blend Properties | | | |
|---|---|---|---|---|---|---|---|---|---|---|
| No. | Wt. % in Blend | m/m BCB | Wt % BCB | Wt. % BCB in Blend | Wt. % in Blend | MFR | MFR | Equil. Load at 200° C. (g) | Shear sensitivity $\eta/\eta$ (0.3/10) | Izod impact ft. lb./in. (J/m) |
| 35* | — | — | — | — | 100 | 13.0 | 13 | 2 | 1.00 | 17 (900) |
| 36 | 5.0 | 0.06 | 2.75 | 0.14 | 95 | 13.0 | 4.4 | 56 | 1.56 | 16 (850) |
| 37 | 7.0 | 0.06 | 2.75 | 0.19 | 93 | 13.0 | 1.5 | 116 | 1.92 | 15 (800) |
| 38 | 9.0 | 0.06 | 2.75 | 0.25 | 91 | 13.0 | 1.1 | 200 | 2.22 | 16 (850) |

*Not an example of the present invention.

(decrease the melt flow rate) of the compositions prepared.

TABLE IX

Effect of HMWB PC Molecular Weight on Blend MFR (22 MFR PC)

| No. | m/m BCB | Wt. % BCB in BCB PC | Wt. % BCB PC in Blend | % BCB Total (m/m × wt %) | MFR |
|---|---|---|---|---|---|
| 24* | — | — | 0 | — | 22 |
| 25 | 0.03 | 1.40 | 6.00 | 0.08 | 22.5 |
| 26 | 0.03 | 1.40 | 14.00 | 0.20 | 13.4 |
| 27 | 0.03 | 1.40 | 20.00 | 0.28 | 8.1 |
| 28 | 0.06 | 2.75 | 3.00 | 0.08 | 21.6 |
| 29 | 0.06 | 2.75 | 7.00 | 0.19 | 6.1 |
| 30 | 0.06 | 2.75 | 10.00 | 0.28 | 2.7 |
| 31 | 0.1 | 4.51 | 1.50 | 0.07 | 24.5 |
| 32 | 0.1 | 4.51 | 3.00 | 0.14 | 4.4 |
| 33 | 0.1 | 4.51 | 7.00 | 0.32 | >0.5 |
| 34 | 0.1 | 4.51 | 10.00 | 0.45 | >0.5 |

*Not an example of the present invention.

In Table X it is is shown that blends based on HMWB PC improved in melt strength (Equil. Load) as shown by the increased loads that can be supported and Shear Sensitivity (processability) as shown by the lower $\eta/\eta$ ratio while they maintained their toughness. The blends of Table X were prepared by the process described above and used for preparing the blends of Table III.

The shear sensitivity measurements for the polymers of Tables X and XI were done by dynamic mechanical spectroscopy (DMS), as mentioned above. The viscosity ($\eta$) of the polymer was measured under two different shear levels, 0.3 radians per second (lower shear) and 10 radians per second (higher shear) by dynamic mechanical spectroscopy at 280° C. Then, the ratio of those two numbers is determined, $\eta/\eta$ (0.3/10). The value of the $\eta/\eta$ ratio for the linear polycarbonate control sample was then taken as a baseline value of 1. The $\eta/\eta$ ratios for the other sample were converted to comparable values by dividing by the value of the $\eta/\eta$ ratio for the linear polycarbonate control sample. Values of these $\eta/\eta$ ratios greater than 1, preferably greater than or equal to 1.5, more preferably greater than or equal to 2, show that there is an "improvement" or "increase" in shear sensitivity The samples shown in Table XI were prepared by solution blending the components in dichloromethane precipitation in hot water. In Table XI it is is shown that blends based on 200,000 Mw linear PC were not significantly improved in processability as shown by the lower $\eta/\eta$ ratio (improved shear sensitivity). In Table XI, the high molecular weight PC is linear and has an Mw of 200,000 and the MFR was not measurable.

TABLE XI

Effect of High Molecular Weight PC on PC Shear Sensitivity

| | Base PC | | | High Molecular Weight PC | | Shear sensitivity |
|---|---|---|---|---|---|---|
| No. | Wt. % | Mw | MFR | Wt. % | Mw | $\eta/\eta$ (0.3/10) |
| 39* | 100 | 26,500 | 13 | 0 | 200,000 | 1 |
| 40* | 95 | 26,500 | 13 | 5 | 200,000 | 1.20 |
| 41* | 91 | 26,500 | 13 | 9 | 200,000 | 1.27 |

*Not an example of the present invention.

As understood by those skilled in this art, there are many other embodiments of the invention in addition to these represented above. These examples, therefore, cannot be construed as limiting the scope of this invention in any way.

What is claimed is:

1. A carbonate polymer blend composition comprising a first high molecular weight branched carbonate polymer component and a second, different carbonate polymer component having a lower molecular weight than the first component, characterized in that the first high molecular weight branched carbonate polymer component is themally stable at a temperature at least 100° C. above the Tg of the carbonate polymer blend composition and that the first high molecular weight branched carbonate polymer component has been prepared from a precursor component with latent reactive moleties selected from the group consisting of arylcyclobutene, cyanate, biphenylene, vinyl, propargyl, acrylic, methacrylic and allyl, in situ after combination with the second carbonate polymer component and has a weight average molecular weight of at least about 99,100.

2. A carbonate polymer blend composition comprising a first high molecular weight branched carbonate polymer component and a second, different carbonate polymer component having a lower molecular weight than the first component, characterized in that the first high molecular weight branched carbonate polymer component is thermally stable at a temperature at least 100° C. above the Tg of the carbonate polymer blend composition and wherein the first high molecular weight branched carbonate polymer component has been prepared from a precursor component with latent reactive moieties selected from the group consisting of arylcyclobutene, cyanate, biphenylene, vinyl, propargyl, acrylic, methacrylic and allyl, in situ after combination with the second carbonate polymer component and has a weight average molecular weight of at least about 3 times that of the second carbonate polymer component.

3. A carbonate polymer blend composition according to claim 1 comprising from about 1 to about 35 weight percent high molecular weight branched carbonate polymer component based on weight of first and second components.

4. A carbonate polymer blend composition according to claim 1 wherein the first carbonate polymer component is prepared from a precursor component comprising a carbonate polymer having one or more latently reactive moieties capable of forming a high molecular weight branched carbonate polymer upon heat activation.

5. A carbonate polymer blend composition according to claim 4 wherein the latently reactive moieties are activated without the use of an additional free radical initiator compound and at temperatures below which the carbonate polymers are degraded.

6. A carbonate polymer blend composition according to claim 4 wherein the latently reactive moieties of the precursor component are substantially free of nitrogen.

7. A carbonate polymer blend composition according to claim 4 wherein the latently reactive moieties of the precursor component are incorporated into a carbonate polymer during preparation of the carbonate polymer in an interfacial polymerization process.

8. An intermediate carbonate polymer blend composition comprising a precursor component having one or more latently reactive moieties selected from the group consisting of arylcyclobutene, cyanate, biphenylene, vinyl, propargyl, acrylic, methacrylic and allyl and capable of forming a high molecular weight branched carbonate polymer upon heat activation and a second, different carbonate polymer component having a lower molecular weight than the high molecular weight branched component where the high molecular weight branched carbonate polymer component is thermally stable at a temperature at least 100° C. above the Tg of the carbonate polymer blend composition and that the high molecular weight branched carbonate polymer component has a weight average molecular weight of at least about 99,100.

9. An intermediate carbonate polymer blend composition according to claim 8 wherein the precursor component is capable of forming a first high molecular weight branched carbonate polymer component having a weight average molecular weight of at least about 3 times that of the second carbonate polymer component.

10. A carbonate polymer blend composition according to claim 8 comprising from about 1 to about 35 weight percent precursor component based on weight of precursor and second components.

11. A carbonate polymer blend composition according to claim 8 wherein the precursor component comprises terminally located, latently reactive arylcyclobutene moieties.

12. A carbonate polymer blend composition according to claim 1, 8 or 11 wherein the second carbonate polymer component comprises all or part recycle, regrind and/or scrap carbonate polymer.

13. An improved process for preparing a blend of a first, high molecular weight branched carbonate polymer component and a second, lower molecular weight carbonate polymer component different from the first carbonate polymer component comprising the steps of (a) preparing a precursor component capable of forming the first high molecular weight branched carbonate polymer component, said precursor component comprising a carbonate polymer containing latent thermally activated reactive moieties selected from the group consisting of arylcyclobutene, cyanate, biphenylepe, vinyl, propargyl, acrylic, methacrylic and allyl; (b) combining the precursor component with the second carbonate polymer; and (c) themally activating the latently reactive moleties of the precursor component to provide a generally homogeneous carbonate polymer blend composition.

14. An improved process for preparing a carbonate polymer blend composition according to claim 13 where, in step (b), the precursor component is combined with the second carbonate polymer by solution blending.

15. An improved process for preparing a carbonate polymer blend composition according to claim 13 where, in step (b), the precursor component is combined with the second carbonate polymer component by (1) dry blending or dual feeding the precursor component with the second, lower molecular weight carbonate polymer component and then (2) melt blending the precursor and second components at a temperature and for a time less than sufficient to significantly thermally activate the latently themally reactive moieties and (3) recovering an intermediate carbonate polymer blend composition comprising a precursor component having one or more latently reactive moieties capable of forming a high molecular weight branched carbonate polymer component upon heat activation and a second, different carbonate polymer component having a lower molecular weight than the high molecular weight branched component.

16. An improved process for preparing a carbonate polymer blend composition according to claims 14 or 15 where, in step c, the latently reactive moieties of the precursor component are thermally activated in an extrusion or molding step to provide a shaped article prepared from a generally homogeneous blend of a first, high molecular weight branched carbonate polymer component and a second, lower molecular weight carbonate polymer component different from the first carbonate polymer component.

17. An improved process for preparing a carbonate polymer blend composition according to claim 13 where, in step (a) the precursor component containing latent thermally reactive moieties is prepared by an interfacial polymerization process.

18. An improved process for preparing a carbonate polymer blend according to claim 13 where, in step (a) the latent themally reactive moieties comprise terminally located arylcyclobutene moieties.

19. An improved process for preparing a carbonate polymer blend according to claim 13 where, in step (b) the second carbonate polymer component comprises all or part recycle, regrind and/or scrap carbonate polymer.

20. An improved process for preparing a carbonate polymer blend according to claim 13 where, in step (b) the blend of precursor and second components comprises from about 1 to about 35 weight percent precursor component based on weight of precursor and second components.

21. An improved process for preparing an opaque, reduced gloss shaped article from a carbonate polymer composition comprising the step of employing a blend according to claims 1 or 4, and characterized by preparing a shaped article having lower gloss than an article similarly prepared from the same composition not containing the first carbonate polymer component.

22. An opaque, reduced gloss shaped article prepared from a carbonate polymer blend composition according to claims 1 or 4 and characterized by having lower gloss than an article similarly prepared from the same composition not containing the first carbonate polymer component.

23. A translucent shaped article prepared from a carbonate polymer blend composition consisting essentially of a first high molecular weight branched carbonate polymer light diffusing component and a second, different, lower molecular weight carbonate polymer component, where the high molecular weight branched carbonate polymer component is themally stable at a temperature at least 100° C. above the Tg of the carbonate polymer blend composition and the high molecular weight branched carbonate polymer component has been prepared from a precursor component with latent reactive moleties selected from the group consisting of arylcyclobutene, cyanate, biphenylene, vinyl, propargyl, acrylic, methacrylic and allyl, in situ after combination with the second carbonate poller component and has a weight average molecular weight of at least about 99,100 and wherein the article has a diffused light transmission of at least about 7%, a total light transmission value of at least about 40%.

24. A translucent shaped article according to claim 23 wherein the light diffusing component is a first high molecular weight branched carbonate polymer component and the carbonate polymer component is a second, different carbonate polymer having a lower molecular weight than the first high molecular weight branched carbonate polymer component.

25. A translucent shaped article according to claim 24 wherein the light diffusing component is a high molecular weight branched carbonate polymer component prepared from a precursor component having one or more latently reactive moieties capable of forming a high molecular weight branched carbonate polymer upon heat activation.

26. An ignition resistant, carbonate polymer blend composition comprising, as a first component, a carbonate polymer drip reducing additive selected from the group consisting of a high molecular weight branched carbonate polymer and a carbonate polymer having one or more latently reactive moleties selected from the group consisting of arylcyclobutene, cyanate, biphenylene, vinyl, propargyl, acrylic, methacrylic and allyl capable of forming a high molecular weight branched carbonate polymer upon heat activation under ignition conditions; as a second component, a second different carbonate polymer component; and, as an optional third component, other ignition resistance additives, wherein the ignition resistance of the blend composition, when tested according to UL 94 attains at least a V-O rating at 1/8 inch (3.175 mm) or is more ignition resistant.

27. An ignition resistant, transparent carbonate polymer blend composition according to claim 26.

28. An ignition resistant, carbonate polymer blend composition according to claim 26 wherein the carbonate polymer drip reducing additive is a high molecular weight branched carbonate polymer.

29. A shaped article prepared from a carbonate polymer blend composition according to claims 1, 4, 26, 27 or 28.

30. A shaped article prepared from a carbonate polymer blend composition according to claim 29 wherein the second carbonate polymer component comprises all or part recycle, regrind and/or scrap carbonate polymer.

31. An improved process for preparing a blow molded or thermoformed part comprising the step of employing a carbonate polymer resin blend according to claims 1, 4 or 8.

32. An improved process for preparing a fiber from a carbonate polymer composition comprising the step of employing a blend according to claims 1, 4 or 8.

33. An improved fiber having a diameter of from about 0.1 to about 1.5 millimeter and a length of at least about 2 millimeters prepared from a carbonate polymer blend composition according to claim 1, 4 or 8.

\* \* \* \* \*

UNITED STATES PATENT AND TRADEMARK OFFICE
CERTIFICATE OF CORRECTION

PATENT NO. : 5,552,224
DATED : September 3, 1996
INVENTOR(S) : Laughner et al

Page 1 of 3

It is certified that error appears in the above-identified patent and that said Letters Patent is hereby corrected as shown below:

Title Page, Abstract, line 10, "latent themally reactive" should correctly read --latent thermally reactive--.

Title Page, Abstract, line 13, "Arylcyclobutene moleties are" should correctly read --Arylcyclobutene moieties are--.

Title Page, Abstract, line 14, "reactive moleties. The" should correctly read --reactive moieties. The--.

Claim 1, column 26, line 57, "component is themally" should correctly read --component is thermally--.

Claim 1, column 26, line 62, "reactive moleties selected" should correctly read --reactive moieties selected--.

Claim 2, column 27, line 10, "reactive moleties selected" should correctly read --reactive moieties selected--.

Claim 6, column 27, line 32, "reactive moleties of" should correctly read --reactive moieties of--.

Claim 7, column 27, line 35, "reactive moleties of" should correctly read --reactive moieties of--.

Claim 11, column 27, line 66, "arylcyclobutene moleties." should correctly read --arylcyclobutene moieties--.

UNITED STATES PATENT AND TRADEMARK OFFICE
CERTIFICATE OF CORRECTION

PATENT NO. : 5,552,224
DATED : September 3, 1996
INVENTOR(S) : Laughner et al

It is certified that error appears in the above-identified patent and that said Letters Patent is hereby corrected as shown below:

Claim 13, column 28, line 12, "reactive moleties selected" should correctly read --reactive moieties selected--.

Claim 13, column 28, line 14, "biphenylepe vinyl," should correctly read --biphenylene vinyl,--.

Claim 13, column 28, line 16, "(c) themally activating" should correctly read --(c) thermally activating--.

Claim 13, column 28, line 17, "reactive moleties of" should correctly read --reactive moieties of--.

Claim 15, column 28, line 32, "latently themally reactive" should correctly read --latently thermally reactive--.

Claim 18, column 28, line 57, "cyclobutene moleties" should correctly read --cyclobutene moieties--.

Claim 23, column 29, line 22, "reactive moleties selected" should correctly read --reactive moieties selected--.

UNITED STATES PATENT AND TRADEMARK OFFICE
CERTIFICATE OF CORRECTION

PATENT NO. : 5,552,224
DATED : September 3, 1996
INVENTOR(S) : Laughner et al

It is certified that error appears in the above-identified patent and that said Letters Patent is hereby corrected as shown below:

Claim 26, column 30, line 8, "reactive moleties selected" should correctly read --reactive moieties selected--.

Signed and Sealed this

Fourth Day of April, 2000

Attest:

Q. TODD DICKINSON

Attesting Officer

Director of Patents and Trademarks